(12) United States Patent
Um et al.

(10) Patent No.: US 9,467,320 B2
(45) Date of Patent: Oct. 11, 2016

(54) METHOD AND SYSTEM FOR PERFORMING INITIAL RANGING IN COGNITIVE RADIO NETWORK

(71) Applicant: Electronics and Telecommunications Research Institute, Daejeon (KR)

(72) Inventors: Jung-Sun Um, Daejeon (KR);
Sung-Hyun Hwang, Daejeon (KR);
Sung-Jin Yoo, Daejeon (KR);
Byung-Jang Jeong, Daejeon (KR);
Jae-Ick Choi, Daejeon (KR)

(73) Assignee: Electronics and Telecommunications Research Instit, Daejeon (KR)

( * ) Notice: Subject to any disclaimer, the term of this patent is extended or adjusted under 35 U.S.C. 154(b) by 121 days.

(21) Appl. No.: 14/450,757

(22) Filed: Aug. 4, 2014

(65) Prior Publication Data

US 2015/0188746 A1 Jul. 2, 2015

(30) Foreign Application Priority Data

Dec. 26, 2013 (KR) .......................... 10-2013-0164143

(51) Int. Cl.
*H04J 3/00* (2006.01)
*H04L 27/26* (2006.01)

(52) U.S. Cl.
CPC ......... *H04L 27/2663* (2013.01); *H04L 27/266* (2013.01); *H04L 27/2646* (2013.01)

(58) Field of Classification Search
USPC ........ 370/336, 335, 210, 350, 503; 375/260, 375/316, 343, 224; 455/161.1
See application file for complete search history.

(56) References Cited

U.S. PATENT DOCUMENTS

| 2009/0197550 A1* | 8/2009 | Huttunen | H04L 5/0062 455/161.1 |
| 2010/0111017 A1 | 5/2010 | Um et al. | |
| 2013/0051447 A1* | 2/2013 | Yoon | H04L 27/2657 375/224 |

FOREIGN PATENT DOCUMENTS

| KR | 1020080094629 A | 10/2008 |
| WO | 2008130165 A1 | 10/2008 |

OTHER PUBLICATIONS

IEEE Computer Society, Part 22: Cognitive Wireless RAN Medium Access Control (MAC) and Physical Layer (PHY) Specifications: Policies and Procedures for Operation in the TV Bands, IEEE Jul. 1, 2011, New York, NY.

* cited by examiner

*Primary Examiner* — Chi H Pham
*Assistant Examiner* — Alexander O Boakye
(74) *Attorney, Agent, or Firm* — William Park & Associates Ltd.

(57) ABSTRACT

Disclosed herein are a method and a system for performing initial ranging in a cognitive radio network The method for performing initial ranging in a cognitive radio network includes: detecting signals received in one or more ranging sections; estimating a tint time offset based on a correlation between subcarrier indices of the signals detected in the one or more ranging sections; estimating a second time offset based on correlations for the signals detected in the one or more ranging sections and a plurality of codes that are predetermined and detecting an initial ranging code among the plurality of codes; and estimating a time offset of a CPE performing initial ranging with the detected initial ranging code using the first time offset and the second time offset that are estimated.

16 Claims, 8 Drawing Sheets

METHOD AND SYSTEM FOR PERFORMING INITIAL RANGING IN COGNITIVE RADIO NETWORK

CROSS REFERENCE TO RELATED APPLICATION

This application claims the benefit of Korean Patent Application No. 10-2013-0164143, filed on Dec. 26, 2013, entitled "Method and System for Performing Initial Ranging in Cognitive Radio Network", which is hereby incorporated by reference in its entirety into this application.

BACKGROUND OF THE INVENTION

1. Technical Field

The present invention relates to performance of initial ranging in a cognitive radio network, and more particularly, to a method and a system for performing initial ranging in a cognitive radio network capable of minimizing calculation in a base station in consideration of an operation environment of a cognitive radio based network, for example, a wireless regional area network (WRAN) system and estimating an approximate time offset.

2. Description of the Related Art

IEEE802.22 is a standard defining a physical (PHY) layer and a data link (MAC) layer of a wireless regional area network (WRAN) system providing a wireless communication services in a cell coverage from 30 km to 100 km using a television (TV) idle channel.

A new customer-premises equipment (CPE) should perform an initial access procedure in order to access a WRAN network, and a ranging process of performing time synchronization so that signals transmitted from CPEs may arrive at a base station at a predetermined point in time should be first performed before a meaningful message is transmitted.

This procedure is called initial ranging, the CPE transmits a randomly selected code, and the base station detects the corresponding code and controls the corresponding CPE to perform the initial access process.

In the IEEE802.22 standard, five orthogonal frequency division multiplexing (OFDM) symbol sections are defined as sections for the initial ranging in consideration of a cell coverage of 100 km, and each CPE selects a random code for the initial ranging and generates and transmits three phase-continuous OFDM symbols.

The base station should detect the transmitted code. In addition, the base station estimates an amount of phase offset depending on an arrival delay together with the selected code to inform the CPE transmitting the ranging signal of the time offset, and the corresponding CPE reflects the time offset and again transmits the ranging signal.

When an accurate point in time is confirmed, the CPE transmits a message to the base station, thereby making it possible to perform the initial access procedure.

An initial ranging signal used in the WRAN system is generated depending on the following Equation 1 so that phase discontinuity between the OFDM symbols is not present.

$$s(n,l) = \sum_{k=0}^{N_{FFT}-1} \left[ b_k \cdot e^{j2\pi \frac{k \cdot l \cdot N_{CP}}{N_{FFT}}} \right] \cdot e^{j2\pi \frac{k \cdot n}{N_{FFT}}} = \sum_{k=0}^{N_{FFT}-1} b_k \cdot e^{j2\pi \frac{k \cdot (n+l \cdot N_{CP})}{N_{FFT}}},$$ [Equation 1]

-continued $$b_k = \begin{cases} 2 \cdot \left(\frac{1}{2} - C_i\right), & i = i+1, k \in R \\ 0, & k \notin R \end{cases}$$

where $s(n, l)$ is the $l^{th}$ OFDM symbol for initial ranging with the sample index $n$. $l$ is [0, 1, 2].

$k$ is the subcarrier index in the channel $C_i$ is the ranging code defined in 9.9.3.1.1.

$i = [0 \sim N_{code} - 1]$ where $N_{code}$ is the length of the CDMA code $R$ is the set of index of subcarriers within the ranging subchannel $N_{FFT}$ is the size of 2K FFT, 2048

$N_{CP}$ is the size of the cyclic prefix

Figure 1:
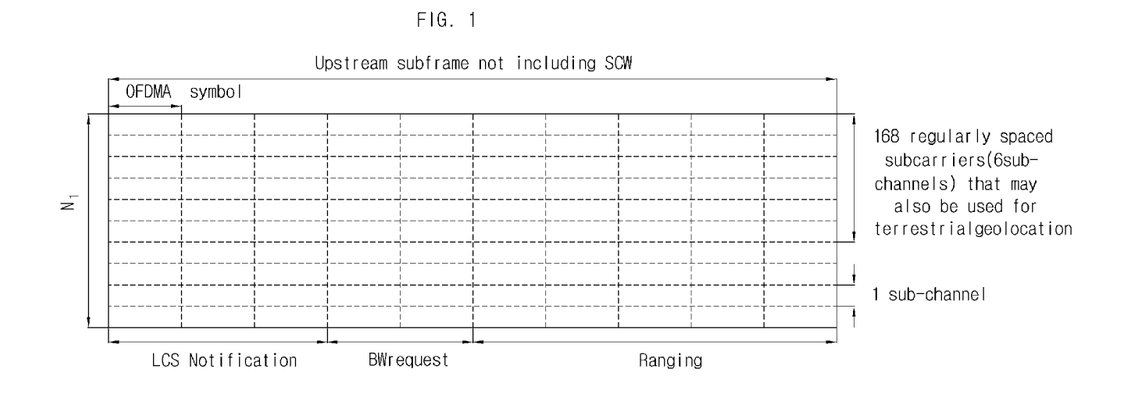
FIG. 1 is an illustrative diagram showing an upstream resource.

Since a phase among the three OFDM symbols is continuous, in the case in which fast Fourier transform (FFT) is performed except for both distal ends of the ranging signal, an inter-cell interference (ICI) phenomenon depending on the phase discontinuity does not appear. Each CPE transmits the initial ranging signal in a region for performing ranging among upstream resources shown in FIG. 1, and a time error appears from a first symbol start position of a resource allocated for the ranging depending on a round-trip delay corresponding to a distance difference between the base station and the CPE.

Therefore, the ranging signal is positioned in first to third symbol sections in the case in which a delay is not substantially generated and is positioned in third to fifth symbol sections in the case in which a maximum delay is generated. In this case, since a delay offset (phase offset) that is to be estimated has a range corresponding to the number of 2048 samples, which is an FFT size, an integer multiple error of the OFDM symbol may not be detected.

Therefore, a process of detecting approximate positions of the symbols is required. In addition, since all selectable random codes should be multiplied by codes corresponding to combinations of phase offsets for 2048 sample delays of the respective codes in a method of detecting a signal, a number of calculation processes are required.

SUMMARY OF THE INVENTION

An object of the present invention is to provide a method and a system for performing initial ranging in a cognitive radio network capable of minimizing calculation consumed in a base station in order to detect a ranging signal when performing the initial ranging of a cognitive radio based network system, for example, a wireless regional area network (WRAN) system and performing time synchronization when an actual signal is received.

Another object of the present invention is to provide a method and a system for performing initial ranging in a cognitive radio network capable of controlling an initial ranging signal to arrive at a point in time required by a base station by estimating a distance between the base station and a customer-premises equipment (CPE) in the CPE based on position information of the CPE.

According to an exemplary embodiment of the present invention, there is provided a method for performing initial ranging in a cognitive radio network, including: detecting signals received in one or more ranging sections; estimating a first time offset based on a correlation between subcarrier indices of the signals detected in the one or more ranging sections; estimating a second time offset based on correlations for the signals detected in the one or more ranging sections and a plurality of codes that are predetermined and detecting an initial ranging code among the plurality of codes; and estimating a time offset of a CPE performing initial ranging with the detected initial ranging code using the first time offset and the second time offset that are estimated.

The estimating of the first time offset may include: converting the respective signals detected in two neighboring ranging sections among the ranging sections into a frequency domain; performing a correlation between two frequency domain signals converted into the frequency domain to calculate a correlation value; and comparing the calculated correlation value with a preset threshold value to estimate the first time offset.

In the estimating of the first time offset, a correlation between two frequency domain signals in a second ranging section and a third ranging section among first to fifth ranging sections may be performed to calculate a first correlation value, a correlation between two frequency domain signals in the third ranging section and a fourth ranging section among the first to fifth ranging sections may be performed to calculate a second correlation value, and the first correlation value may be compared with a first threshold value that is predetermined, the second correlation value may be compared with a second threshold value that is predetermined, and the first time offset may be estimated based on results of the two comparisons.

In the calculating of the correlation value, any one of the two frequency domain signals may be complex-conjugated, and a correlation between the frequency conversion signal generated by complex-conjugating the any one frequency domain signal and the other frequency domain signal may be performed to calculate the correlation value.

In the converting of the respective signals detected in the two neighboring ranging sections among the ranging sections into the frequency domain, the signals detected in the ranging sections may be converted into the frequency domain using fast Fourier transform (FFT).

The method for performing initial ranging in a cognitive radio network may further include comparing a result value by the correlation between the subcarrier indices of the signals detected in the one or more ranging sections with a third threshold value that is predetermined, wherein the estimating of the first time offset is performed in the case in which the result value is the third threshold value or more.

In the detecting of the initial ranging code, correlation values for the plurality of codes and the signals detected in one or more ranging sections may be calculated with respect to each of a plurality of time offsets that are predetermined, any one time offset having a maximum value among the calculated correlation values among the plurality of time offsets may be estimated as the second time offset, and any one of the plurality of codes may be detected as the initial ranging code.

According to another exemplary embodiment of the present invention, there is provided a method for transmitting an initial ranging signal in a CPE of a cognitive radio network, including: deriving a distance up to a base station and a radio wave transfer time based on position information of the CPE and position information of the base station; performing synchronization with a downstream transmitted from the base station and estimating a start point in time of an upstream in the base station in consideration of a transmitted receive transition gap between a download point in time and an upload point in time in the CPE; deriving a signal transmission point in time based on the distance up to the base station and the radio wave transfer time that are derived and the start point in time of the upstream that is estimated; estimating a time offset in consideration of channel information to the base station; and determining an initial ranging signal transmission point in time for transmitting the initial ranging signal to the base station by reflecting the signal transmission point in time that is derived and the time offset that is estimated.

According to still another exemplary embodiment of the present invention, there is provided an apparatus for performing initial ranging in a cognitive radio network, including: a signal detecting unit detecting signals received in one or more ranging sections; a first estimating unit estimating a first time offset based on a correlation between subcarrier indices of the signals detected in the one or more ranging sections; a second estimating unit estimating a second time offset based on correlations for the signals detected in the one or more ranging sections and a plurality of codes that are predetermined and detecting an initial ranging code among the plurality of codes; and a third estimating unit estimating a time offset of a CPE performing initial ranging with the detected initial ranging code using the first time offset and the second time offset that are estimated.

According to yet still another exemplary embodiment of the present invention, there is provided an apparatus for transmitting an initial ranging signal in a CPE of a cognitive radio network, including: a first driving unit deriving a distance up to a base station and a radio wave transfer time based on position information of the CPE and position information of the base station; a first estimating unit performing synchronization with a downstream transmitted from the base station and estimating a start point in time of an upstream in the base station in consideration of a transmitted receive transition gap between a download point in time and an upload point in time in the CPE; a second deriving unit deriving a signal transmission point in time based on the distance up to the base station and the radio wave transfer time that are derived and the start point in time of the upstream that is estimated; a second estimating unit estimating a time offset in consideration of channel information to the base station; and a determining unit determining an initial ranging signal transmission point in time for transmitting the initial ranging signal to the base station by reflecting the signal transmission point in time that is derived and the time offset that is estimated.

DESCRIPTION OF THE EXEMPLARY EMBODIMENTS

Other objects and features of the present invention in addition to the above-mentioned objects will become obvious through a description for exemplary embodiments with reference to the accompanying drawings.

Exemplary embodiments of the present invention will be described with reference to the accompanying drawings. In describing exemplary embodiments of the present invention, well-known functions or constructions will not be described in detail since they may unnecessarily obscure the understanding of the present invention.

However, the present invention will be not limited or restricted to exemplary embodiments. Like reference numerals used in the respective drawing denote like components.

Hereinafter, a method and a system for performing initial ranging in a cognitive radio network according to an exemplary embodiment of the present invention will be described with reference to FIGS. 2 to 8.

Figure 2:
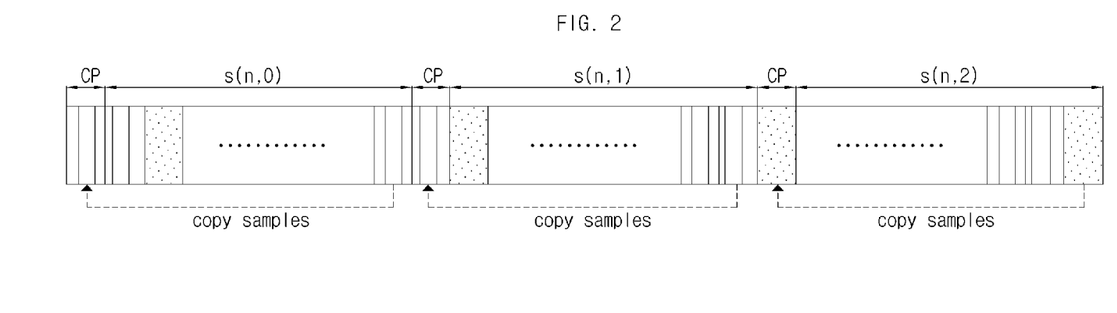
FIG. 2 is an illustrative diagram showing a structure of an initial ranging signal.

An initial ranging signal used in a wireless regional area network (WRAN) system has a structure as shown in FIG. 2 according to Equation 1 so that phase discontinuity between orthogonal frequency division multiplexing (OFDM) symbols is not present. In addition, as described above, each customer-premises equipment (CPE) transmits the initial ranging signal in a region for performing ranging among upstream resources of FIG. 1, and a time error appears from a first symbol start position of a resource allocated for the ranging depending on a round-trip delay corresponding to a distance difference between a base station and the CPE Therefore, the ranging signal is positioned in first to third symbol sections in the case in which a delay is not substantially generated and is positioned in third to fifth symbol sections in the case in which a maximum delay is generated. In this case, since a delay offset (phase offset) that may be estimated only in a cross correlation scheme of the ranging signal has a range corresponding to the number of 2048 samples, which is a fast Fourier transform (FFT) size, an integer multiple error of the OFDM symbol may not be detected. Therefore, a process of detecting approximate positions of the symbols is required. In addition, since all selectable random codes should be multiplied by codes corresponding to combinations of phase offsets for 2048 sample delays of the respective codes in a method of detecting a signal, a number of calculation processes are required. Further, in the WRAN system, since a fixed CEP is mainly installed and operated, the case in which a subscriber subscribes to a network and then withdraws from the network as in a mobile communication system or a worldwide interoperability for microwave access (WIMAX) is not present, such that the case in which the initial ranging signal is transmitted is rare.

The present invention is to estimate an approximate time delay corresponding to an integer multiple of an OFDM symbol while detecting whether or not an initial ranging signal has arrived in consideration of an operation environment of the WRAN system as described above and minimize a base station arrival delay time of the initial ranging signal based on position information of a base station and a CPE in the case in which the CPE is installed by a skilled engineer.

Figure 3:
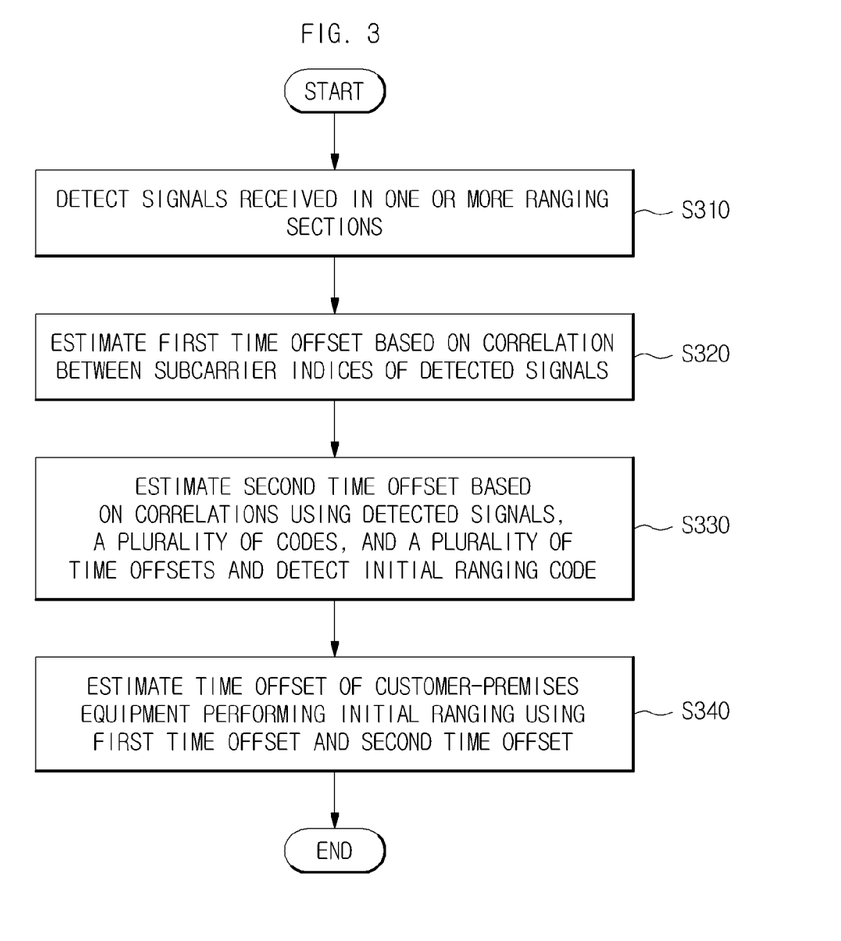
FIG. 3 is an operation flow chart of a method for performing initial ranging in a cognitive radio network according to an exemplary embodiment of the present invention.

FIG. 3 is an operation flow chart of a method for performing initial ranging in a cognitive radio network according to an exemplary embodiment of the present invention.

Referring to FIG. 3, in the method for performing initial ranging in a cognitive radio network according to an exemplary embodiment of the present invention, signals received in one or more ranging sections are detected (S310).

Figure 4:
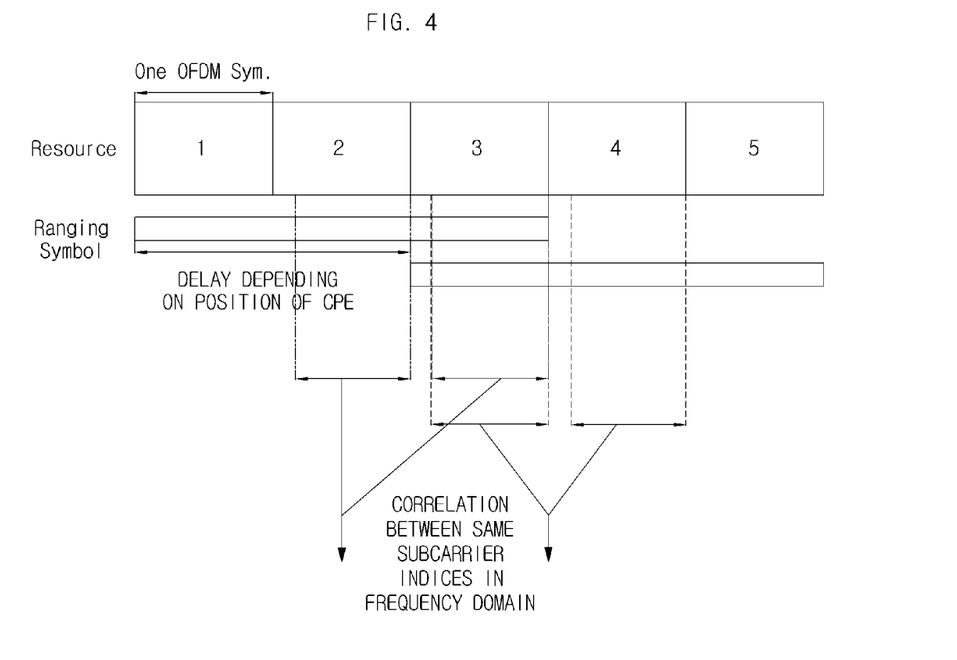
FIG. 4 is an illustrative diagram for describing concepts of a ranging resource and a correlation region.

For example, as in an example shown in FIG. 4, signals received in second and fourth ranging sections 2 to 4 among five predetermined ranging sections 1 to 5 may be detected.

Here, the ranging section includes at least one OFDM symbol, as shown in FIG. 4, and this ranging section may be one OFDM symbol unit.

When the signals are detected in one or more ranging sections in S310, a first time offset is estimated based on a correlation between subcarrier indices of the detected signals (S320).

In detail, in Step S320 of estimating the first time offset, the first time offset may be estimated by converting the respective signals detected in two neighboring ranging sections, for example, the second and third ranging sections and/or the third and fourth ranging section, among the ranging sections in which the signals are detected into a frequency domain, performing a correlation between two frequency domain signals converted into the frequency domain to calculate a correlation value, and then comparing the calculated correlation value with a preset threshold value.

Here, the signals received in the respective ranging sections may be converted into the frequency domain by FFT.

A process of estimating the first time offset will be described with reference to an example of FIG. 4.

As shown in FIG. 4, a correlation between two frequency domain signals in the second and third ranging sections 2 and 3 among the first to fifth ranging sections 1 to 5 is performed to calculate a first correlation value, and a correlation between two frequency domain signals in the third and fourth ranging sections 3 and 4 among the first to fifth ranging sections 1 to 5 is performed to calculate a second correlation value.

Here, any one of frequency conversion signals of the second and third ranging sections and any one of frequency conversion signals of the third and fourth ranging sections may be complex-conjugated, and the first and second correlation values may be calculated through a correlation between the frequency conversion signals generated by complex-conjugating any one frequency conversion signal and the other frequency conversion signal.

In addition, the first time offset is estimated through a comparison result between the first correlation value that is calculated and a first threshold value that is predetermined and a comparison result between the second correlation value that is calculated and a second threshold value that is predetermined.

Here, the first time offset estimated in Step S320 is a value corresponding to an FFT size (NFFT). Therefore, in the case in which NFFT is 2048, the first time offset may be a time offset in 2048 unit. For example, the first time offset may be a value of 0, 2048, 4096, or the like.

Here, most of ranging signals are positioned in the second to fourth ranging sections among the first to fifth ranging sections in the case in which the first correlation value is larger than the first threshold value and the second correlation value is larger than the second threshold value, are positioned in the first to third ranging sections among the first to fifth ranging sections in the case in which the first correlation value is larger than the first threshold value and the second correlation value is smaller than the second threshold value, and are positioned in the third to fifth ranging sections among the first to fifth ranging sections in the case in which the first correlation value is smaller than the first threshold value and the second correlation value is larger than the second threshold value.

The first and second threshold values compared with the correlation values, respectively, in Step S320 may be the same as each other or be different from each other, which may be changed depending on a situation.

Additionally, in the process of estimating the first time offset, at least one of the first and second correlation values may be compared with a third threshold value that is predetermined, and the first time offset may be estimated through the above-mentioned process only in the case in which at least one of the first and second correlation values is the third threshold value or more as a result of the comparison. That is, in the case in which at least one of the first and second correlation values is larger than the third threshold value that is predetermined as the result of comparison between at least one of the first and second correlation values and the third threshold value, it is decided that the ranging signals have been received, and the first time offset is estimated using the received ranging signals.

Here, the third threshold value may be set in consideration of false alarm possibility, that is, the possibility that it will be erroneously decided that the signal is present although the signal is not present.

In the present invention, a correlation equation for detecting the ranging signal in which an influence of a channel and an influence of a time error are reflected may be represented by the following Equation 2.

$$Y_{n,k(i)} \cdot Y^*_{n+1,k(i)} = \qquad [\text{Equation 2}]$$
$$H_{n,k(i)} \cdot X_{n,k(i)} \cdot e^{j2\pi k(i)(n\cdot N+\tau)} \cdot H^*_{n+1,k(i)} \cdot X^*_{n+1,k(i)} \cdot$$
$$e^{-j2\pi k(i)((n+1)\cdot N+\tau)} = \|H\|^2 \cdot \|X\|^2 \cdot e^{-j2\pi k(i)N}$$

Here, Y indicates a frequency conversion signal, H indicates channel response characteristics in the frequency domain, $H_{n,k}$ indicates a value of a k-th subcarrier of an n-th OFDM symbol, N indicates a size of FFT, X indicates a signal modified in a predetermined format from a ranging code transmitted by a transmitter, for example, a signal modified in a binary phase shift keying (BPSK) format, and τ indicates a time offset of a signal received by a base station.

When the first time offset is estimated in Step S320, a second time offset is estimated based on correlations for the signals detected in one or more ranging sections, a plurality of codes that are predetermined, and a plurality of time offsets that are predetermined, and an initial ranging code among the plurality of codes is detected (S330).

Here, in Step S330, correlation values for the plurality of codes and the signals detected in one or more ranging sections may be calculated with respect to each of the plurality of time offsets that are predetermined, any one time offset having a maximum value among the calculated correlation values among the plurality of time offsets may be estimated as the second time offset, and any one of the plurality of codes may be detected as the initial ranging code.

In Step S330, the second time offset and the initial ranging code may be detected using the following Equation 3.

$$\sum_{i=0}^{N-1} Y_{n,k(i)} \cdot R_{C,k(i)} Y_{n,k(i)} \cdot R_{C,k}(i) = \qquad [\text{Equation 3}]$$
$$H_{n,k(i)} \cdot X_{n,k(i)} \cdot e^{j2\pi k(i)\tau} \cdot X^*_{C,k(i)} \cdot e^{-j2\pi k(i)\tau'} =$$
$$H_{n,k(i)} \cdot \|X_{n,k(i)}\|^2 \cdot e^{j2\pi k(i)(\tau-\tau')}$$

Here, C indicates the number of a plurality of codes that are predetermined, $R_c$ indicates predetermined initial ranging codes, n indicates an OFDM symbol index, k indicates a subcarrier index, i indicates an index of a ranging code permutation, both of τ and τ' indicate a temporal offset, and τ' indicates a time offset value applied at a transmitting end depending on a symbol index in a process of generating three OFDM symbols and corresponding to an integer multiple of a protection section size. For example, τ' may be 0 in the case of a first ranging OFDM symbol and be Ncp (number of samples of a protection section) in the case of a second ranging OFDM symbol.

An initial ranging code having the largest value among summation values for a plurality (C) of initial ranging codes calculated in Equation 3 may be detected as an initial ranging code of the CPE, the process as described above may be performed with respect to each of a plurality (M) of time offsets that are predetermined, a time offset having the largest summation value among the plurality of time offsets and the plurality of initial ranging codes may be estimated as the second time offset, and the initial ranging code may be detected as the initial ranging code of the CPE. That is, the process as described above is performed with respect to C codes and M time offsets n times to detect the second time offset and the initial ranging code of the CPE.

When the second time offset and the initial ranging code of the CPE are detected in Step S330, a time offset of the CPE performing initial ranging with the initial ranging code detected in Step S330 is estimated using the first time offset estimated in Step S320 and the second time offset estimated in Step S330 (S340).

Figure 5:
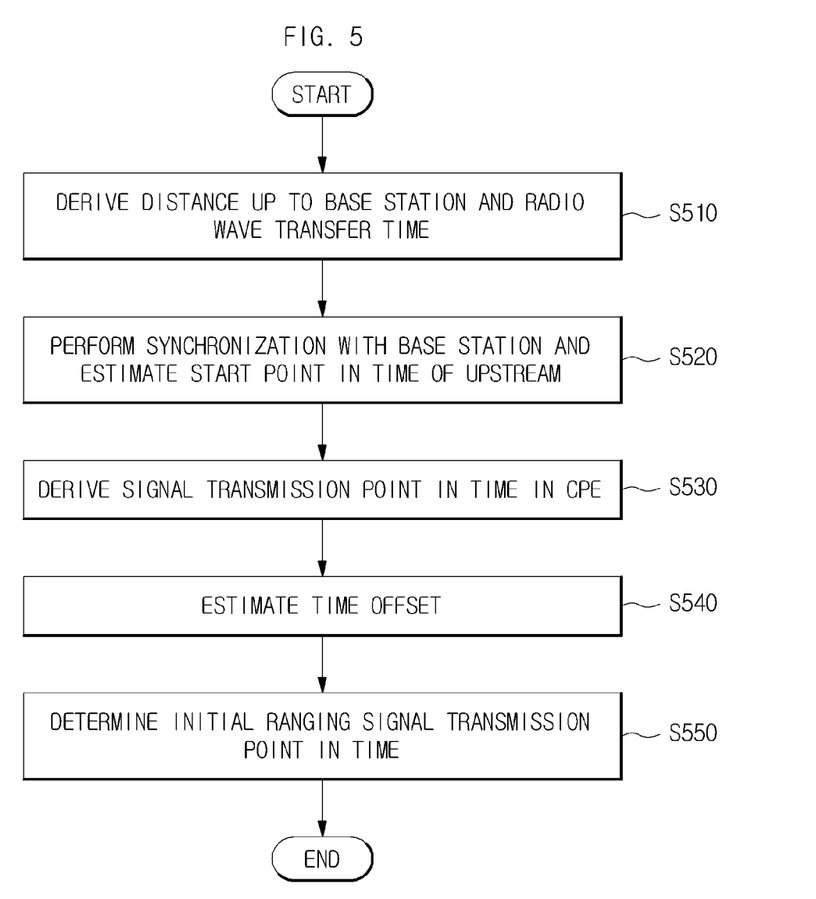
FIG. 5 is an operation flow chart of a method for transmitting an initial ranging signal in a customer-premises equipment (CPE) of a cognitive radio network according to an exemplary embodiment of the present invention.

FIG. 5 is an operation flow chart of a method for transmitting an initial ranging signal in a CPE of a cognitive radio network according to an exemplary embodiment of the present invention.

Referring to FIG. 5, in the method for transmitting an initial ranging signal in a CPE, a distance up to a base station and a radio wave transfer time, for example, a round trip delay, is derived based on position information of the CPE and position information of the base station.

Here, the position information of the CPE and the position information of the base station may be derived based on a global positioning system (GPS) function embedded in the CPE, position information of the base station and the CPE input by a CPE installing engineer, antenna height information, and the like.

When the distance up to the base station and the radio wave transfer time are derived, synchronization with a downstream transmitted from the base station is performed, and a start point in time of an upstream (US) in the base station is estimated in consideration of a transmitted receive transition gap (TTG) between a download (DL) point in time and an upload (UL) point in time in the CPE (S520).

Here, the start point in time of the upstream means a section in which all CPEs transmit UL after DL transmission in the base station ends, such that a UL signal starts at the same point in time.

Therefore, when positions of the base station and the CPE are recognized, an approximate radio wave transfer time may be estimated. Accordingly, the CPE may recognize a point in time at which a signal is to be transmitted in order to arrive at the base station at a UL start point in time defined in the base station. Since the TTG is defined in consideration of a maximum size of a cell so as to support up to a CPE positioned at a boundary of the cell, a CPE positioned in the vicinity of the base station has only to transmit the signals after it waits for a predetermined period.

A signal transmission point in time in the CPE is derived based on the distance up to the base station and the radio wave transfer time derived in Step S510 and the start point in time of the upstream estimated in Step S520.

In Step S530, UL data transmitted by all of the CPEs need to arrive at the base station in the same UL start point in time. However, since transmission points in time are different from each other depending on positions of the CPEs, different signal transmission points in time may be defined per CPE. Initial ranging signals are transmitted, the base station decides the time offset and transmits values to be adjusted to the respective CPEs, and the CPEs control the signal transmission point in time. Therefore, the signal transmission point in time for transmitting the data before an actual UL start time of the base station is derived based on an error estimated as the ranging signal.

When the signal transmission point in time in the CPE is derived, a time offset is estimated in consideration of channel information to the base station (S540).

Here, in Step S540, the time offset may be estimated in further consideration of an estimation error. When a signal is reflected without being straightly moved due to an influence of terrain features between the base station and the CPE, a time in which the signal arrives at the base station may be slightly changed, such that a difference between the time and an actual calculation value is generated. The difference generated as described above may be the estimation error. In addition, when channel estimation is performed, a second arrival signal may have energy larger than that of a first arrival signal. If time synchronization with this is desired, information on impulse response characteristics obtained by the channel estimation may also be used.

Finally, an initial ranging signal transmission point in time for transmitting the initial ranging signal to the base station is determined by reflecting the signal transmission point in time in the CPE derived in Step S530 and the time offset estimated in Step S540 (S550).

Figure 6:
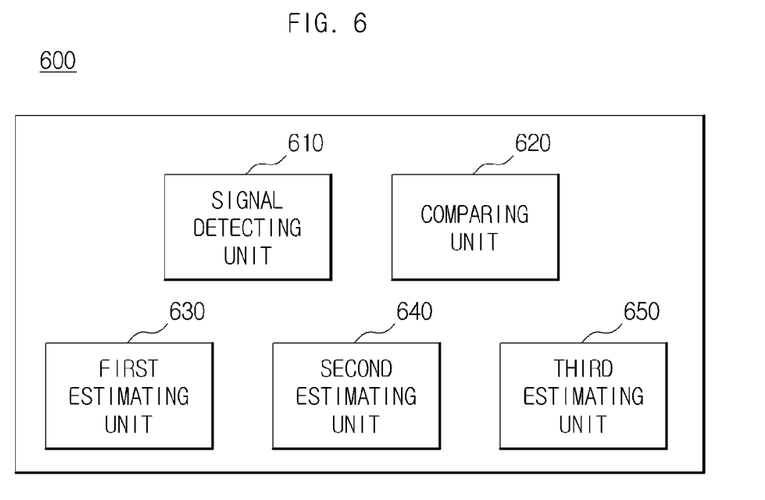
FIG. 6 is a diagram showing a configuration of an apparatus for performing initial ranging in a cognitive radio network according to an exemplary embodiment of the present invention.
Figure 7:
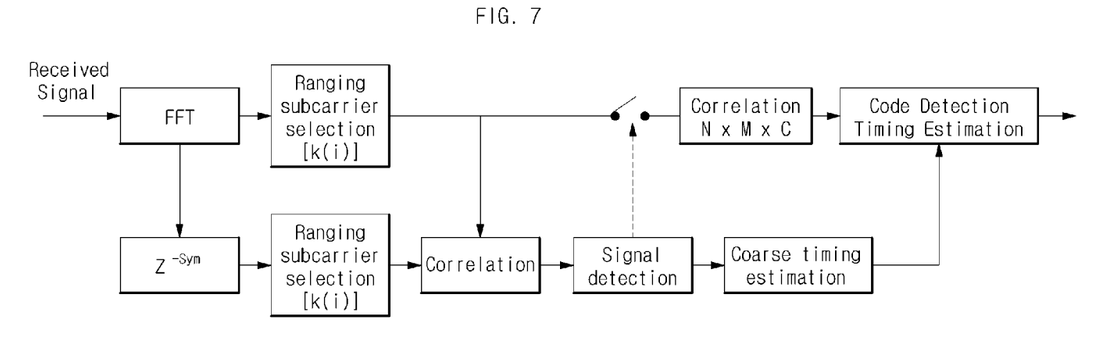
FIG. 7 is an illustrative diagram showing the apparatus shown in FIG. 6.

FIG. 6 is a diagram showing a configuration of an apparatus for performing initial ranging in a cognitive radio network according to an exemplary embodiment of the present invention; and FIG. 7 is an illustrative diagram showing the apparatus shown in FIG. 6 and shows an apparatus performing the method shown in FIG. 3.

Referring to FIGS. 6 and 7, the apparatus 600 for performing initial ranging in a cognitive radio network according to an exemplary embodiment of the present invention is configured to include a signal detecting unit 610, a comparing unit 620, a first estimating unit 630, a second estimating unit 640, and a third estimating unit 650.

The signal detecting unit 610 detects signals received in one or more ranging sections.

For example, as in an example shown in FIG. 4, signals received in second to fourth ranging sections 2 to 4 among five predetermined ranging sections 1 to 5 may be detected.

The comparing unit 620 compares a result value by a correlation between indices of subcarriers of the signals detected in one or more ranging sections by the signal detecting unit 610 with a predetermined threshold value.

Here, the comparing unit 620 may include a signal detection block and a switch controlled by the signal detection block that are shown in FIG. 7 and may be included in the first estimating unit 630, if necessary.

The first estimating unit 630, which estimates a first time offset in the case in which the result value by the correlation is the predetermined threshold value or more as a result of the comparison by the comparing unit 620, estimates the first time offset based on the correlation between the indices of the subcarriers of the signals detected in one or more ranging sections by the signal detecting unit 610.

Here, the first estimating unit 630 may be configured so as to include the comparing unit 620, and may include an FFT block, $Z^{-Sym}$ block, a ranging subcarrier selection block, a correlation block, a signal detection block, and a coarse timing estimation block that are shown in FIG. 7.

The first estimating unit 630 may estimate the first time offset by converting the respective signals detected in two neighboring ranging sections, for example, the second and third ranging sections and/or the third and fourth ranging section, among the ranging sections in which the signals are detected into a frequency domain, performing a correlation between two frequency domain signals converted into the frequency domain to calculate a correlation value, and then comparing the calculated correlation value with a preset threshold value.

Here, the first estimating unit 630 may convert the signals received in the respective ranging sections into the frequency domain signals using FFT.

Here, the first estimating unit 630 may complex-conjugate any one of frequency conversion signals of the second and third ranging sections and any one of frequency conversion signals of the third and fourth ranging sections, calculating first and second correlation values through a correlation between the frequency conversion signals generated by complex-conjugating any one frequency conversion signal and the other frequency conversion signal, and then estimate the first time offset through a comparison result between the first correlation value that is calculated and a first threshold value that is predetermined and a comparison result between the second correlation value that is calculated and a second threshold value that is predetermined.

The second estimating unit 640 estimates a second time offset based on correlations for the signals detected in one or more ranging sections, a plurality of codes that are predetermined, and a plurality of time offsets that are predetermined and detects an initial ranging code among the plurality of codes.

Here, the second estimating unit 640 may calculate correlation values for the plurality of codes and the signals detected in one or more ranging sections with respect to each of the plurality of time offsets that are predetermined, estimate any one time offset having a maximum value among the calculated correlation values among the plurality of time offsets as the second time offset, and detect any one of the plurality of codes as the initial ranging code.

The second estimating unit 640 may include a correlation NxMxC block shown in FIG. 7 and may detect the second time offset and the initial ranging code of the CPE using the above Equation 3.

The third estimating unit 650 estimates a time offset of the CPE performing initial ranging with the detected initial ranging code using the first time offset and the second time offset that are estimated.

Here, the third estimating unit 650 may include a code detection timing estimation block shown in FIG. 7.

Figure 8:
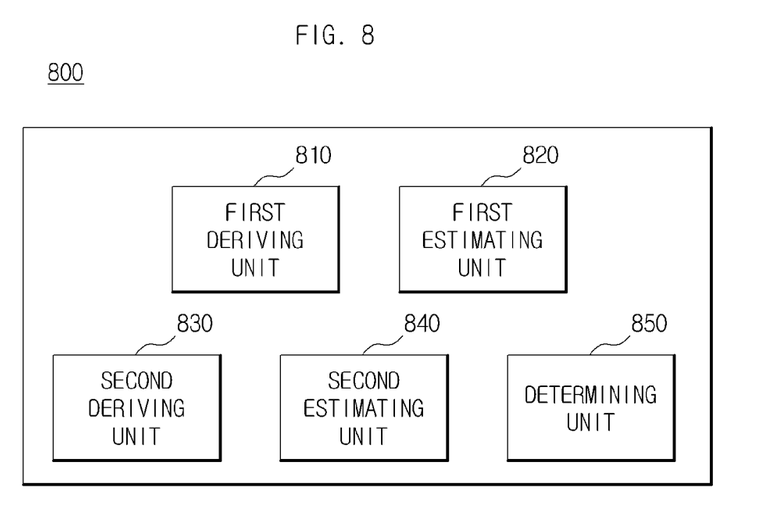
FIG. 8 is a diagram showing a configuration of an apparatus for transmitting an initial ranging signal in a CPE of a cognitive radio network according to an exemplary embodiment of the present invention.

FIG. 8 is a diagram showing a configuration of an apparatus for transmitting an initial ranging signal in a CPE of a cognitive radio network according to an exemplary embodiment of the present invention and shows an apparatus performing the method shown in FIG. 5.

Referring to FIG. 8, the apparatus 800 for transmitting an initial ranging signal in a CPE of a cognitive radio network according to an exemplary embodiment of the present invention is configured to include a first deriving unit 810, a first estimating unit 820, a second deriving unit 830, a second estimating unit 840, and a determining unit 850.

The first deriving unit 810 derives a distance up to a base station and a radio wave transfer time based on position information of the CPE and position information of the base station.

Here, the first deriving unit 810 may derive the position information of the CPE and the position information of the base station based on a global positioning system (GPS) function embedded in the CPE, position information of the base station and the CPE input by a CPE installing engineer, antenna height information, and the like.

The first estimating unit 820 performs synchronization with a downstream transmitted from the base station and estimates a start point in time of an upstream (US) in the base station in consideration of a transmitted receive transition gap between a download point in time and an upload point in time in the CPE.

Here, the start point in time of the upstream means a section in which all CPEs transmit UL after DL transmission in the base station ends, such that a UL signal starts at the same point in time.

The second deriving unit 830 derives a signal transmission point in time based on the distance up to the base station and the radio wave transfer time that are derived and the start point in time of the upstream that is estimated.

The second estimating unit 840 estimates a time offset in consideration of channel information to the base station and an estimation error.

The determining unit 850 determines an initial ranging signal transmission point in time for transmitting the initial ranging signal to the base station by reflecting the signal transmission point in time in the CPE that is derived and the time offset that is estimated.

According to exemplary embodiments of the present invention, it is possible to minimize calculation consumed in a base station in order to detect a ranging signal when performing initial ranging of a cognitive radio based network system, for example, a wireless regional area network (WRAN) system, and it is possible to perform time synchronization when an actual signal is received.

In addition, according to exemplary embodiments of the present invention, it is possible to control an initial ranging signal to arrive at a point in time required by a base station by estimating a distance between the base station and a CPE based on position information of the CPE in the case in which an antenna and a WRAN transceiver of the CPE are installed by a skilled installing engineer.

Hereinabove, although the present invention is described by specific matters such as concrete components, and the like, exemplary embodiments, and drawings, they are provided only for assisting in the entire understanding of the present invention. Therefore, the present invention is not limited to exemplary embodiments. Various modifications and changes may be made by those skilled in the art to which the present invention pertains from this description.

Therefore, the spirit of the present invention is not interpreted to be limited to exemplary embodiments described in the present specification, and the following claims as well as all modified equally or equivalently to the claims is to fall within the scope and spirit of the invention.

What is claimed is:

1. A method for performing initial ranging in a cognitive radio network, comprising:
   detecting signals received in one or more ranging sections;
   estimating a first time offset based on a correlation between subcarrier indices of the signals detected in the one or more ranging sections;
   estimating a second time offset based on correlations for the signals detected in the one or more ranging sections and a plurality of codes that are predetermined and detecting an initial ranging code among the plurality of codes; and
   estimating a time offset of a customer-premises equipment (CPE) and informing the CPE of the time offset, the CPE performing initial ranging with the detected initial ranging code using the first time offset and the second time offset that are estimated and reflecting the time offset.

2. The method for performing initial ranging in a cognitive radio network of claim 1, wherein the estimating of the first time offset includes:
   converting the respective signals detected in two neighboring ranging sections among the ranging sections into a frequency domain;
   performing a correlation between two frequency domain signals converted into the frequency domain to calculate a correlation value; and
   comparing the calculated correlation value with a preset threshold value to estimate the first time offset.

3. The method for performing initial ranging in a cognitive radio network of claim 2, wherein in the estimating of the first time offset, a correlation between two frequency domain signals in a second ranging section and a third ranging section among first to fifth ranging sections is performed to calculate a first correlation value, a correlation between two frequency domain signals in the third ranging section and a fourth ranging section among the first to fifth ranging sections is performed to calculate a second correlation value, and the first correlation value is compared with a first threshold value that is predetermined, the second correlation value is compared with a second threshold value that is predetermined, and the first time offset is estimated based on results of the two comparisons.

4. The method for performing initial ranging in a cognitive radio network of claim 2, wherein in the calculating of the correlation value, any one of the two frequency domain signals is complex-conjugated, and a correlation between the frequency conversion signal generated by complex-conjugating the any one frequency domain signal and the other frequency domain signal is performed to calculate the correlation value.

5. The method for performing initial ranging in a cognitive radio network of claim 2, wherein in the converting of the respective signals detected in the two neighboring ranging sections among the ranging sections into the frequency domain, the signals detected in the ranging sections are converted into the frequency domain using fast Fourier transform (FFT).

6. The method for performing initial ranging in a cognitive radio network of claim 1, further comprising comparing a result value by the correlation between the subcarrier indices of the signals detected in the one or more ranging sections with a third threshold value that is predetermined, wherein the estimating of the first time offset is performed in the case in which the result value is the third threshold value or more.

7. The method for performing initial ranging in a cognitive radio network of claim 1, wherein in the detecting of the initial ranging code, correlation values for the plurality of codes and the signals detected in one or more ranging sections are calculated with respect to each of a plurality of time offsets that are predetermined, any one time offset having a maximum value among the calculated correlation values among the plurality of time offsets is estimated as the second time offset, and any one of the plurality of codes is detected as the initial ranging code.

8. A method for transmitting an initial ranging signal in a CPE of a cognitive radio network, comprising:
deriving a distance up to a base station and a radio wave transfer time based on position information of the CPE and position information of the base station;
performing synchronization with a downstream transmitted from the base station and estimating a start point in time of an upstream in the base station in consideration of a transmitted receive transition gap between a download point in time and an upload point in time in the CPE;
deriving a signal transmission point in time based on the distance up to the base station and the radio wave transfer time that are derived and the start point in time of the upstream that is estimated;
estimating a time offset in consideration of channel information to the base station; and
determining an initial ranging signal transmission point in time for transmitting the initial ranging signal to the base station by reflecting the signal transmission point in time that is derived and the time offset that is estimated.

9. An apparatus for performing initial ranging in a cognitive radio network, comprising:
a signal detecting unit detecting signals received in one or more ranging sections;
a first estimating unit estimating a first time offset based on a correlation between subcarrier indices of the signals detected in the one or more ranging sections;
a second estimating unit estimating a second time offset based on correlations for the signals detected in the one or more ranging sections and a plurality of codes that are predetermined and detecting an initial ranging code among the plurality of codes; and
a third estimating unit estimating a time offset of a customer premises equipment (CPEI and informing the CPE of the time offset the CPE performing initial ranging with the detected initial ranging code using the first time offset and the second time offset that are estimated and reflecting the time offset.

10. The apparatus for performing initial ranging in a cognitive radio network of claim 9, wherein the first estimating unit converts the respective signals detected in two neighboring ranging sections among the ranging sections into a frequency domain, performs a correlation between two frequency domain signals converted into the frequency domain to calculate a correlation value, and compares the calculated correlation value with a preset threshold value to estimate the first time offset.

11. The apparatus for performing initial ranging in a cognitive radio network of claim 10, wherein the first estimating unit performs a correlation between two frequency domain signals in a second ranging section and a third ranging section among first to fifth ranging sections to calculate a first correlation value, performs a correlation between two frequency domain signals in the third ranging section and a fourth ranging section among the first to fifth ranging sections to calculate a second correlation value, and compares the first correlation value with a first threshold value that is predetermined, compares the second correlation value with a second threshold value that is predetermined, and estimates the first time offset based on results of the two comparisons.

12. The apparatus for performing initial ranging in a cognitive radio network of claim 10, wherein the first estimating unit complex-conjugates any one of the two frequency domain signals and performs a correlation between the frequency conversion signal generated by complex-conjugating the any one frequency domain signal and the other frequency domain signal to calculate the correlation value.

13. The apparatus for performing initial ranging in a cognitive radio network of claim 10, wherein the first estimating unit converts the signals detected in the ranging sections into the frequency domain using FFT.

14. The apparatus for performing initial ranging in a cognitive radio network of claim 9, further comprising a comparing unit comparing a result value by the correlation between the subcarrier indices of the signals detected in the one or more ranging sections with a third threshold value that is predetermined, wherein the first estimating unit estimates the first time offset in the case in which the result value is the third threshold value or more.

15. The apparatus for performing initial ranging in a cognitive radio network of claim 9, wherein the second estimating unit calculates correlation values for the plurality of codes and the signals detected in one or more ranging sections with respect to each of a plurality of time offsets that are predetermined, estimates any one time offset having a maximum value among the calculated correlation values among the plurality of time offsets as the second time offset, and detects any one of the plurality of codes as the initial ranging code.

16. An apparatus for transmitting an initial ranging signal in a CPE of a cognitive radio network, comprising:
a first driving unit deriving a distance up to a base station and a radio wave transfer time based on position information of the CPE and position information of the base station;
a first estimating unit performing synchronization with a downstream transmitted from the base station and estimating a start point in time of an upstream in the base station in consideration of a transmitted receive transition gap between a download point in time and an upload point in time in the CPE;
a second deriving unit deriving a signal transmission point in time based on the distance up to the base station and the radio wave transfer time that are derived and the start point in time of the upstream that is estimated;
a second estimating unit estimating a time offset in consideration of channel information to the base station; and a determining unit determining an initial ranging signal transmission point in time for transmitting the initial ranging signal to the base station by reflecting the signal transmission point in time that is derived and the time offset that is estimated.

* * * * *